United States Patent
Zhou et al.

(10) Patent No.: US 11,015,320 B2
(45) Date of Patent: May 25, 2021

(54) ROLLOVER PREVENTION SYSTEM AND METHOD FOR CONSTRUCTION MACHINE

(71) Applicant: Volvo Construction Equipment AB, Eskilstuna (SE)

(72) Inventors: Pingsheng Zhou, Shandong (CN); Huanan Li, Shandong (CN); Qibin Wang, Shandong (CN); Jinpeng Chen, Shandong (CN)

(73) Assignee: Volvo Construction Equipment AB, Eskilstuna (SE)

( * ) Notice: Subject to any disclaimer, the term of this patent is extended or adjusted under 35 U.S.C. 154(b) by 260 days.

(21) Appl. No.: 16/331,659

(22) PCT Filed: Sep. 9, 2016

(86) PCT No.: PCT/CN2016/098499
§ 371 (c)(1),
(2) Date: Mar. 8, 2019

(87) PCT Pub. No.: WO2018/045542
PCT Pub. Date: Mar. 15, 2018

(65) Prior Publication Data
US 2019/0234048 A1 Aug. 1, 2019

(51) Int. Cl.
*E02F 9/20* (2006.01)
*E02F 9/24* (2006.01)
(Continued)

(52) U.S. Cl.
CPC ............ *E02F 9/2033* (2013.01); *B60Q 5/005* (2013.01); *E02F 9/2228* (2013.01);
(Continued)

(58) Field of Classification Search
None
See application file for complete search history.

(56) References Cited

U.S. PATENT DOCUMENTS

| 8,768,581 B2 | 7/2014 | Mizuochi et al. |
| 2010/0301635 A1* | 12/2010 | Andou ............... B62D 33/0617 296/190.05 |

(Continued)

FOREIGN PATENT DOCUMENTS

| CN | 2056165 U | * | 4/1990 |
| CN | 201025755 Y | * | 2/2008 |

(Continued)

OTHER PUBLICATIONS

International Search Report and Written Opinion of the International Searching Authority, PCT/CN2016/098499, dated Jun. 16, 2017, 17 pages.

*Primary Examiner* — Shelley Chen
(74) *Attorney, Agent, or Firm* — Sage Patent Group (57) ABSTRACT

A rollover prevention system prevents a construction machine from rolling over. The rollover prevention system comprises a first angle detection unit (12) disposed adjacent to a turning joint (11) to detect a swing angle of the upper frame (5), a second angle detection unit (13) disposed on the upper frame to detect an angular movement of the upper frame, safety valves (40) disposed on flow passages (25, 32) communicating with hydraulic cylinders for a work attachment (10) and a swing motor (26) to control flows of working oil supplied to the hydraulic cylinders by opening and closing the flow passages in response to external signals, and an electronic controller (14) electrically connected to the first angle detection unit, the second angle detection unit, and the safety valves. The electronic controller comprises a barycenter calculating section (14a), a safety range determining section (14b), and a signal outputting section (14c). A rollover prevention method for a construction machine is also provided. The system could prevent rollover by alarming operators with information regarding the barycenter and (Continued)

forcibly restrain the movement of construction machines when the risk of rollover is increased by the deviation of the barycenter during operation.

18 Claims, 7 Drawing Sheets

(51) Int. Cl.
  *E02F 9/22* (2006.01)
  *B60Q 5/00* (2006.01)
  *E02F 9/26* (2006.01)
  *E02F 3/32* (2006.01)
(52) U.S. Cl.
  CPC .......... *E02F 9/2285* (2013.01); *E02F 9/2292* (2013.01); *E02F 9/24* (2013.01); *E02F 9/26* (2013.01); *E02F 3/32* (2013.01); *E02F 9/2296* (2013.01)

(56) References Cited

U.S. PATENT DOCUMENTS

| 2014/0058625 A1* | 2/2014 | Sun | B60G 17/0162 |
| | | | 701/38 |
| 2016/0214557 A1* | 7/2016 | Villa | B60R 21/0132 |
| 2017/0210190 A1* | 7/2017 | Marano | B60G 13/16 |

FOREIGN PATENT DOCUMENTS

| CN | 201240266 Y | * | 5/2009 | |
| CN | 202347549 U | | 7/2012 | |
| CN | 103518478 A | * | 1/2014 | |
| CN | 203373804 U | | 1/2014 | |
| CN | 102767208 B | * | 8/2014 | |
| EP | 2233354 A1 | * | 9/2010 | ................ B60P 1/26 |
| JP | 2003322112 A | | 11/2003 | |
| JP | 2010127363 A | | 6/2010 | |

* cited by examiner

ROLLOVER PREVENTION SYSTEM AND METHOD FOR CONSTRUCTION MACHINE

CROSS REFERENCE TO RELATED APPLICATIONS

This application is a 35 U.S.C. § 371 national stage application of PCT International Application No. PCT/CN2016/098499 filed on Sep. 9, 2016, the disclosure and content of which is incorporated by reference herein in its entirety.

TECHNICAL FIELD

The present disclosure relates to a rollover prevention system and method for a construction machine. More particularly, the present disclosure relates to a rollover prevention system and method for a construction machine, the system and method able to alarm an operator while blocking the supply of working oil to prevent the construction machine from rolling over or tipping when the barycenter of the construction machine deviates from a safety range or enters a critical range during excavation in a construction place or on a slope.

BACKGROUND OF THE INVENTION

In the operation of a construction machine such as an excavator or a wheel loader, the barycenter of the construction machine variously changes. In particular, during excavation or digging on a slope or in an operation of carrying payloads containing a large amount of rock that causes an excessive load, the barycenter of the construction machine may deviate from an allowable safety range, leading to rollover.

Typically, a construction machine is safer when the barycenter of the construction machine is closer to the swing axis of an upper frame or an upper swing structure. In case where the barycenter is farther away from the swing axis, the degree of safety decreases and, the risk of rollover increases. An operator in a cab cannot recognize a change in the barycenter of the construction machine. Thus, even in the case in which the barycenter of the construction machine has deviated from an allowable safety range, the movement of a work attachment for excavation or digging is still allowed by the operator. Since the work attachment moves during the operation, the barycenter of the construction machine becomes unstable.

No conventional construction machines are provided with a technical means for notifying operators of the deviation of the barycenter from an allowable safety range. There are no solutions to restrict the movement of a work attachment or a construction machine when the risk of rollover is increased due to the barycenter having moved away from the swing axis.

As a well-known example, U.S. Pat. No. 8,768,581 disclosed "WORK MACHINE SAFETY DEVICE." This patent is intended to prevent the rollover of equipment using ZMP calculating means.

However, this patent is not intended to automatically or forcibly restrict the movement of a work attachment or equipment when the risk of rollover is increased by the barycenter deviating from a safety range.

Therefore, construction machines require a function able to prevent rollover by alarming operators with information regarding the barycenter and forcibly restrain the movement of construction machines when the risk of rollover is increased by the deviation of the barycenter during operation.

SUMMARY OF THE INVENTION

According to one aspect of the present disclosure, a rollover prevention system for a construction machine may include:

a first angle detection unit disposed adjacent to a turning joint to detect a swing angle of the upper frame, the turning joint being disposed on a central portion of the upper frame rotatably disposed on an undercarriage;

a second angle detection unit disposed on the upper frame to detect an angular movement of an upper swing structure;

safety valves disposed on flow passages communicating with the hydraulic cylinders for the work attachment and the swing motor, wherein the safety valves control flows of working oil supplied to the hydraulic cylinders by opening and closing the flow passages in response to external signals; and an electronic controller electrically connected to the first angle detection unit, the second angle detection unit, and the safety valves, the electronic controller comprising a barycenter calculating section, a safety range determining section, and a signal outputting section, wherein the barycenter calculating section calculates a barycenter $B_{uc}$ of the undercarriage, a barycenter $B_{uf}$ of the upper frame, a barycenter $B_{at}$ of the work attachment, a first barycenter $B_1$ of the construction machine in a first state, and a second barycenter $B_2$ of the construction machine in a second state, based on values of angles applied from the first angle detection unit and the second angle detection unit based on a preset algorithm, wherein the first barycenter $B_1$ of the construction machine depends on the first state in which the bucket is fully loaded at a farthest distance to the swing axis, while the second barycenter $B_2$ of the construction machine depending on the second state in which the bucket is not loaded at a closest distance G from the swing axis, wherein the safety range determining section determines whether or not the first barycenter $B_1$ and the second barycenter $B_2$ of the construction machine are present in a safety range, and wherein signal outputting section provides a closing signal for the safety valves and an alarm signal to the operator when the first barycenter $B_1$ or the second barycenter $B_2$ of the construction machine deviate from the safety range.

According to an embodiment of the present disclosure, the safety valves may include a first safety valve disposed on one of the flow passages to block a flow of oil supplied from the first hydraulic pump and a second safety valve disposed on the other of the flow passages to block a flow of oil supplied from the second hydraulic pump. When there is a risk of rollover, the movement of the construction machine is forcibly stopped.

According to another aspect of the present disclosure, a rollover prevention method for a construction machine may include:

detecting a change in a swing angle of an upper frame of a construction machine about a swing axis Z with respect to a turning joint using a first angle detection unit disposed adjacent to the turning joint;

detecting an angular movement of the upper swing structure along a width axis X' and a longitudinal axis Y' of the construction machine using a second angle detection unit disposed adjacent to the upper frame;

calculating barycentric coordinates $B_{uf}(x_{uf}, y_{uf}, z_{uf})$ of the upper frame defined with respect to the width axis X, the longitudinal axis Y, and the swing axis Z;

calculating a first barycenter $B_{at1}(X_{at1}, Y_{at1}, Z_{at1})$ of a work attachment in a first state, in which a bucket is fully loaded at a farthest distance to the swing axis Z, and a second barycenter $B_{at2}(X_{at2}, Y_{at2}, Z_{at2})$ of the work attachment in a second state, in which the bucket is not loaded at a closest distance to the swing axis Z, based on a first weight $W_{at1}$ of the work attachment determined in the first state and a second weight $W_{at2}$ of the work attachment determined in the second state; and calculating a first barycenter $B_1(X_1, Y_1, Z_1)$ of the construction machine in the first state and a second barycenter $B_2(X_2, Y_2, Z_2)$ of the construction machine in the second state, based on barycentric coordinates $B_{uc}(X_{uc}, Y_{uc}, Z_{uc})$ of the undercarriage, the weight $W_{uc}$ of the undercarriage, the weight $W_{uf}$ of the upper frame, the weight $W_{at1}$ of the work attachment in the first state, and the weight $W_{at2}$ of the work attachment in the second state.

According to an embodiment of the present disclosure, the rollover prevention method may further include outputting a closing signal for safety valves and an alarm signal to an operator when it is determined that the first barycenter $B_1$ or the second barycenter $B_2$ of the construction machine deviates from the safety range.

DETAILED DESCRIPTION OF THE INVENTION

Reference will now be made in detail to embodiments of the present disclosure, examples of which are illustrated in the accompanying drawings. While the present disclosure will be described in conjunction with the following embodiments, it will be understood that they are not intended to limit the present disclosure to these embodiments alone. On the contrary, the present disclosure is intended to cover alternatives, modifications, and equivalents which may be included within the spirit and scope of the present disclosure as defined by the appended claims. Furthermore, in the following detailed description of the present disclosure, numerous specific details are set forth in order to provide a thorough understanding of the present disclosure. However, embodiments of the present disclosure may be practiced without these specific details. In other instances, well-known methods, procedures, components, and circuits have not been described in detail so as not to unnecessarily obscure aspects of the present disclosure.

Figure 1:
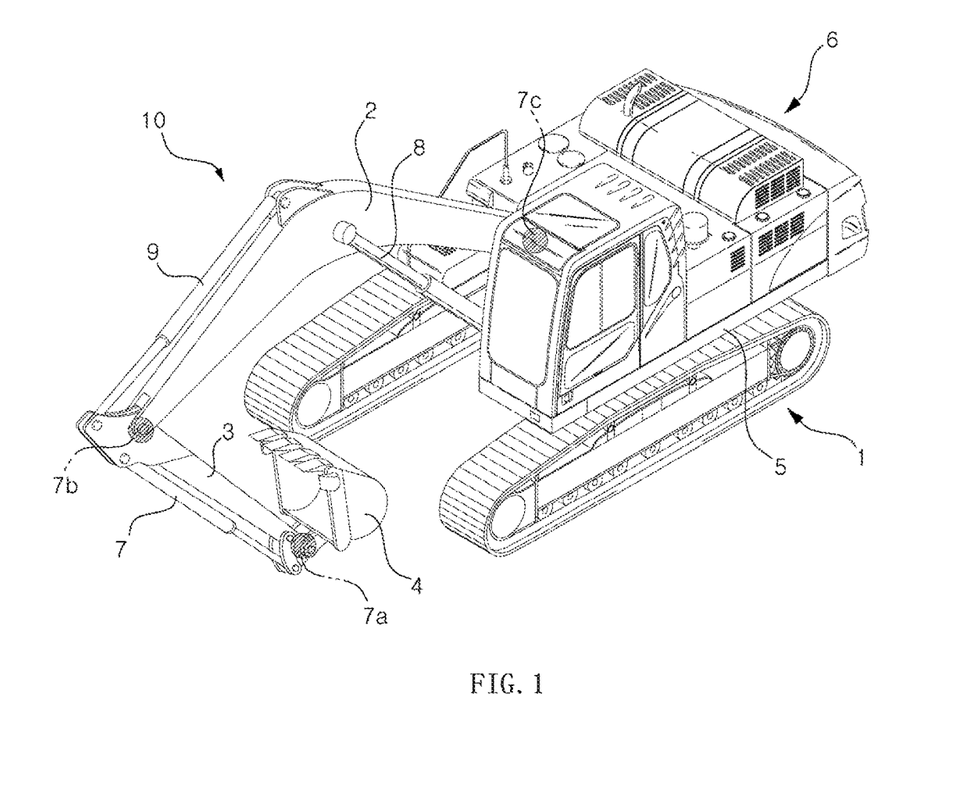
FIG. 1 is a perspective view illustrating an excavator to which the present disclosure is applied.

A rollover prevention system for a construction machine according to an exemplary embodiment of the present disclosure can be used in a construction machine such as an excavator or a wheel loader, and will be described with reference to an exemplary excavator. FIG. 1 is a perspective view illustrating an excavator to which the present disclosure is applied.

As illustrated in FIG. 1, the excavator includes an undercarriage 1 traveling on the surface of the ground using endless tracks and an upper frame 5 rotatably mounted on the undercarriage 1.

An upper swing structure 6 including a work attachment 10 is provided on the upper frame 5. The work attachment 10 includes a boom 2, the proximal portion of which is pivotably connected to the upper frame 5, an arm 3 pivotably connected to the distal portion of the boom 2, and a bucket 4 pivotably connected to the distal portion of the arm 3.

It is preferable that the bucket 4 is fixed to the distal portion of the arm 3 using a bucket fixing pin 7a such that the bucket 4 can pivot about the bucket fixing pin 7a. The proximal portion of the arm 3 is fixed to the distal portion of the boom 2 using an arm fixing pin 7b such that the arm 3 can pivot about the arm fixing pin 7b. The proximal portion of the boom 2 is fixed to the upper frame 5 using a boom fixing pin 7c such that the boom 2 can pivot about the boom fixing pin 7c.

During excavation work in a construction place such as a slope, the boom 2 is driven in response to the extension and contraction of a boom cylinder 8. Likewise, the arm 3 and the bucket 4 are driven in response to the extension and contraction of an arm cylinder 9 and a bucket cylinder 7, respectively. In addition, a swing motor 26 can swing the upper frame 5 including the upper swing structure 6.

It is preferable that the swing motor 26, the boom cylinder 8, the arm cylinder 9, and the bucket cylinder 7 are actuated by a hydraulic source.

Figure 2:
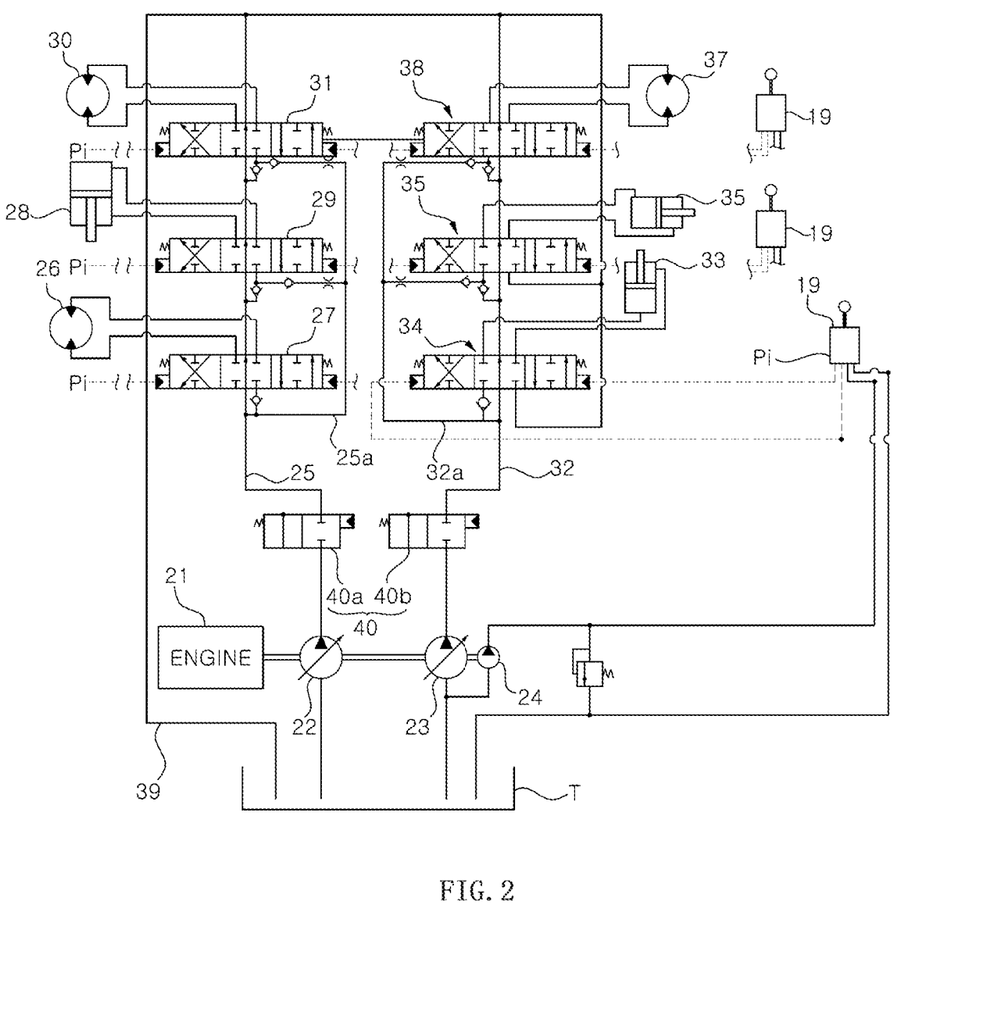
FIG. 2 is a hydraulic circuit diagram for the excavator illustrated in FIG. 1.

FIG. 2 schematically illustrates a hydraulic circuit for the excavator illustrated in FIG. 1. A two-pump hydraulic system is used to drive the excavator to which the present disclosure is applied.

It is preferable that the hydraulic system includes an engine 21, first and second variable capacity hydraulic pumps (hereinafter referred to as "first and second hydraulic pumps") 22 and 23 connected to the engine 21, and a pilot pump 24.

On a flow passage 25 communicating with the first hydraulic pump 22, a swing control valve 27 controlling the operation of the swing motor 26, an arm control valve 29 controlling the operation of the arm cylinder 28, and a travel control valve 31 controlling the operation of a left travel motor 30 are provided.

In addition, on a flow passage 32 communicating with the second hydraulic pump 23, a boom control valve 34 controlling the operation of a boom cylinder 33, a bucket control valve 36 controlling the operation of a bucket cylinder 35, and a travel control valve 38 controlling the operation of a right travel motor 37 are provided.

The flow passages 25 and 32 allow oil discharged from the first hydraulic pump 22 and the second hydraulic pump 23 to be delivered therethrough. A parallel flow passage 25a communicating with the first hydraulic pump 22 is connected to the flow passage 25, while a parallel flow passage 32a communicating with the second hydraulic pump 23 is connected to the flow passage 32. A return line 39 allows hydraulic oil discharged from the first hydraulic pump 22 and the second hydraulic pump 23 to return to a hydraulic tank T therethrough.

Figure 3:
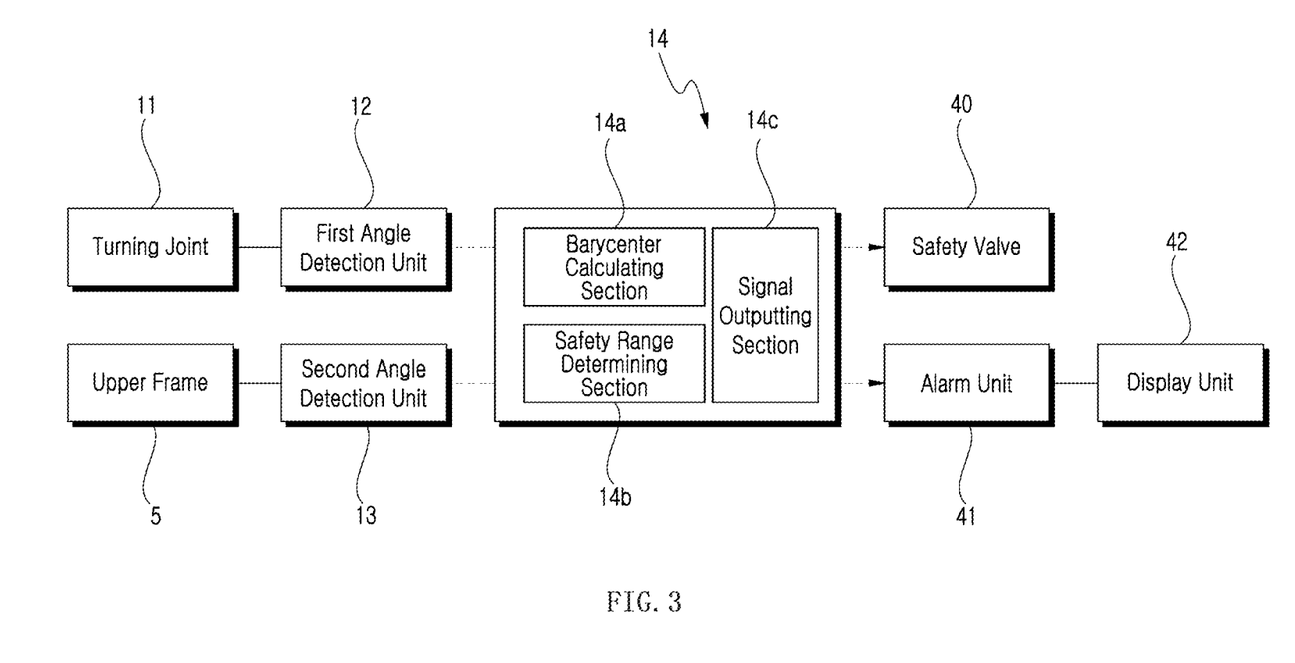
FIG. 3 is a block diagram illustrating a rollover prevention system for a construction machine according to an embodiment of the present disclosure.

FIG. 3 is a block diagram illustrating a rollover prevention system for a construction machine according to an embodiment of the present disclosure.

Referring to the FIG. 3, the rollover prevention system for a construction machine according to the present disclosure includes a first angle detection unit 12 and a second angle detection unit 13. The first angle detection unit 12 is disposed adjacent to a turning joint 11 to detect the swing angle of the upper frame 5. The turning joint 11 is disposed on the central portion of the upper frame 3 rotatably disposed on the undercarriage 1. The second angle detection unit 13 is disposed on the upper frame 5 to detect an angular movement of the upper swing structure 6.

The first angle detection unit 12 includes a rotary encoder. In this case, the swing angle of the upper frame 5 can be detected based on the number of revolutions of a pinion adjacent to the turning joint 11 or a pulse proportional to the swing angle related to a ring gear or a coupling. The second angle detection unit 13 includes a two-axis angle sensor. In this case, the second angle detection unit 13 may be a system-on-chip device disposed on an electronic controller 14 provided in the construction machine. The two axes of the second angle detection unit 13 are defined as a width axis X' and a longitudinal axis Y' of the construction machine.

For excavation work in a working place including a slope, each control device 19 individually provides valve control signals for the switching of valve spools through pilot signal lines Pi. The valve control signal includes a pilot signal or an electrical signal corresponding to the degree of manipulation of an operator.

It is preferable that, when manipulated by the operator, the control device 19 individually provides pilot signal pressures provided from the pilot pump 24 to the spools of the control valves 27, 29, 31, 34, 36, and 38, respectively.

For example, the operator can control the operation of the bucket cylinder 7 and the swing motor 26 by manipulating the control device 19 (e.g. one or more control devices) in a combined manner to perform digging using the bucket, driving the boom up and down, or swinging the upper swing structure during excavation work on a slope.

The rollover prevention system according to the present disclosure includes safety valves 40 disposed on the flow passages 25 and 32 communicating with the hydraulic cylinders 28, 33, and 35 for the work attachment and the swing motor 26. The safety valves 40 open and close the flow passages 25 and 32 in response to external signals such that flows of working oil supplied to the hydraulic cylinders 28, 33, and 35 are controlled.

For example, the safety valves 40 include a first safety valve 40a disposed on the flow passage 25 to block a flow of oil supplied from the first hydraulic pump 22 and a second safety valve 40b disposed on the flow passage 32 to block a flow of oil supplied from the second hydraulic pump 23.

The safety valves 40 are not limited to a hydraulic system having a single hydraulic pump, and should be interpreted as being able to be modified into a variety of forms. For example, in the case of a three-pump hydraulic system, a third safety valve can be added.

It is preferable that each of the safety valves 40 is implemented as a solenoid valve connected to the controller 14 to be opened and closed thereby.

According to another embodiment of the present disclosure, although not shown in the drawings, the safety valves 40 may be individually disposed on pilot signal lines Pi connecting from the control device 19 to the spools of the hydraulic control valves 27, 29, 31, 34, 36, and 38. For example, a pilot signal pressure from the control device 19 may be blocked by the safety valves 40 during boom-up or boom-down operation. Thus, the boom control valve 34 returns to the neutral position due to the elastic force of a valve spring on a slope, thereby stopping the movement of the boom 2 that would otherwise cause the barycenter of the work attachment to deviate.

The rollover prevention system for a construction machine according to the present disclosure includes the electronic controller 14 electrically connected to the first angle detection unit 12, the second angle detection unit 13, and the safety valves 40. The electronic controller 14 includes a barycenter calculating section 14a, a safety range determining section 14b, and a signal outputting section 14c.

The barycenter calculating section 14a calculates the barycenter $B_{uc}$ of the undercarriage 1, the barycenter $B_{uf}$ of the upper frame 5, the barycenter $B_{at}$ of the work attachment 10, a first barycenter $B_1$ of the construction machine in a first state, and a second barycenter $B_2$ of the construction machine in a second state, based on values of angles applied from the first angle detection unit 12 and the second angle detection unit 13 following a preset algorithm. The first barycenter $B_1$ of the construction machine depends on the first state in which the bucket 4 is fully loaded at a farthest distance A to the swing axis Z, while the second barycenter $B_2$ of the construction machine depends on the second state in which the bucket 4 is not loaded at a closest distance G to the swing axis Z.

The safety range determining section 14b determines whether or not the first barycenter $B_1$ or the second barycenter $B_2$ of the construction machine are present in the safety range.

The signal outputting section 14c provides a closing signal for the safety valves 40 and an alarm signal to the operator when the first barycenter $B_1$ or the second barycenter $B_2$ of the construction machine deviate from the safety range.

According to the present disclosure, the barycenters are XYZ coordinates following the right hand law, which can be calculated and determined as coordinates based on the width axis X, the longitudinal axis Y, and the swing axis Z with respect to the turning joint 11 of the construction machine.

Figure 5A:
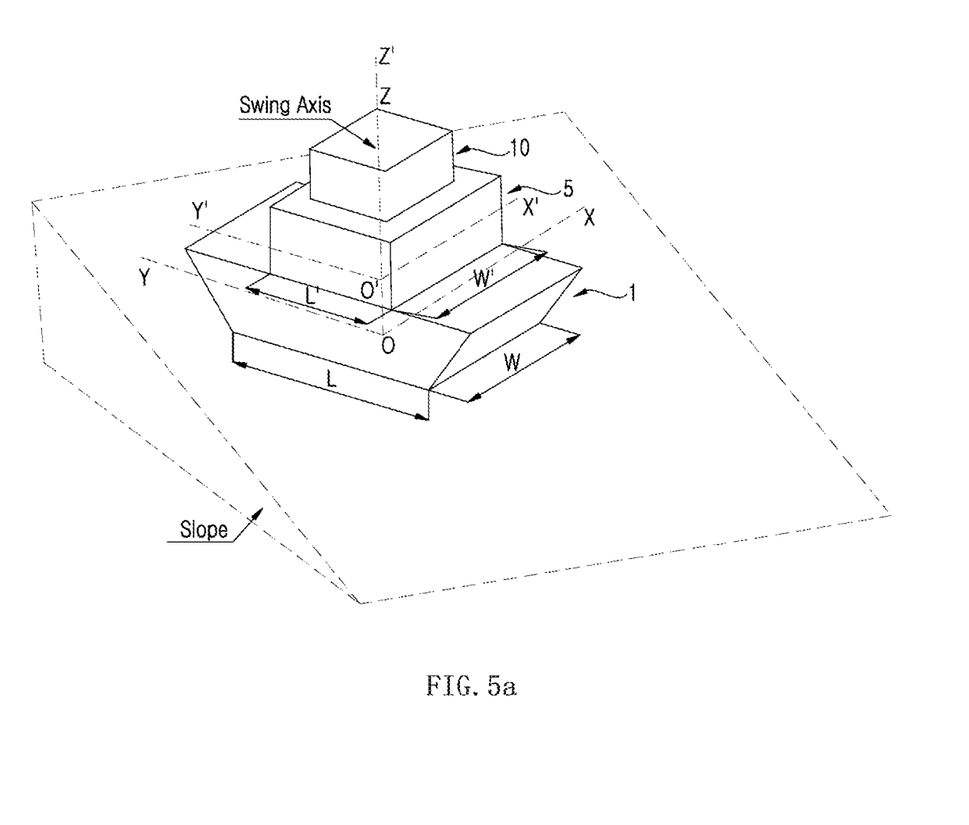
FIG. 5a and FIG. 5b are schematic views illustrating the steps of calculating barycenters and determining a safety range according to the present disclosure.
Figure 5B:
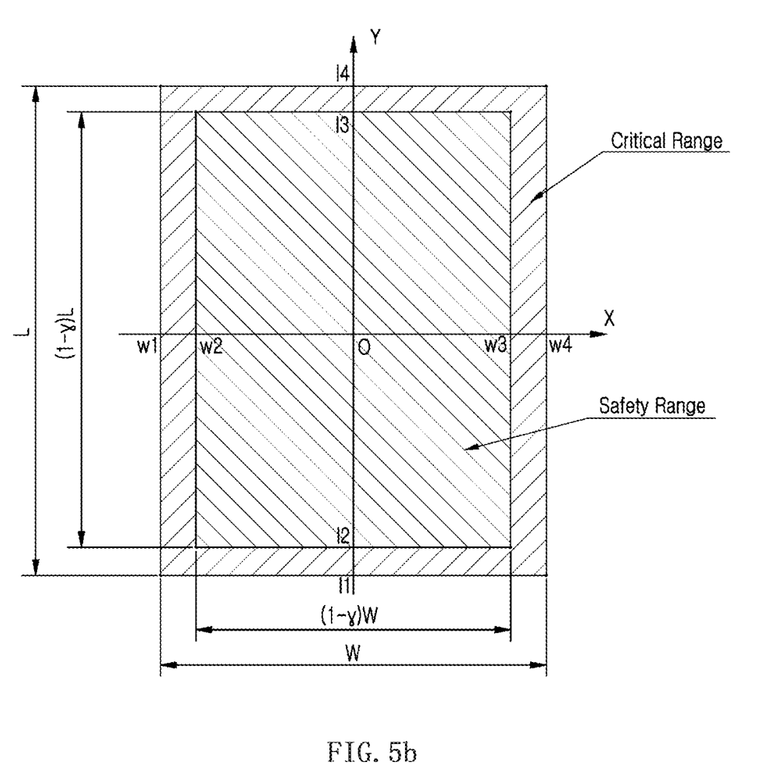

In addition, the safety range should be interpreted as a safe barycentric range, as illustrated in FIG. 5b, in which the construction machine can safely perform excavation work on the ground surface or the surface of a slope in a construction place without rollover or tipping.

The safety range is set within a critical range defined by a contact surface between the undercarriage 1 and the ground, and has rectangular dimensions including a width W of the contact surface along the axis X and a length L of the contact surface along axis Y.

The critical range includes a surface or a tetrahedron, the barycenter of which deviates from the safety range during the working process.

A display unit 42 is connected to the controller 14. The display unit 42 renders the safety range provided by the signal outputting section 14c of the controller 14 such that the safety range can be visually recognized by the operator. It is preferable that the display unit 42 is disposed in a cab provided in the upper swing structure 6.

An alarm unit 41 is connected to the controller 14. The alarm unit 41 provides aural information to the operator when the first barycenter $B_1$ or the second barycenter $B_2$ of the construction machine deviate from the safety range. For example, the alarm unit 41 includes a buzzer or a speaker.

Figure 4:
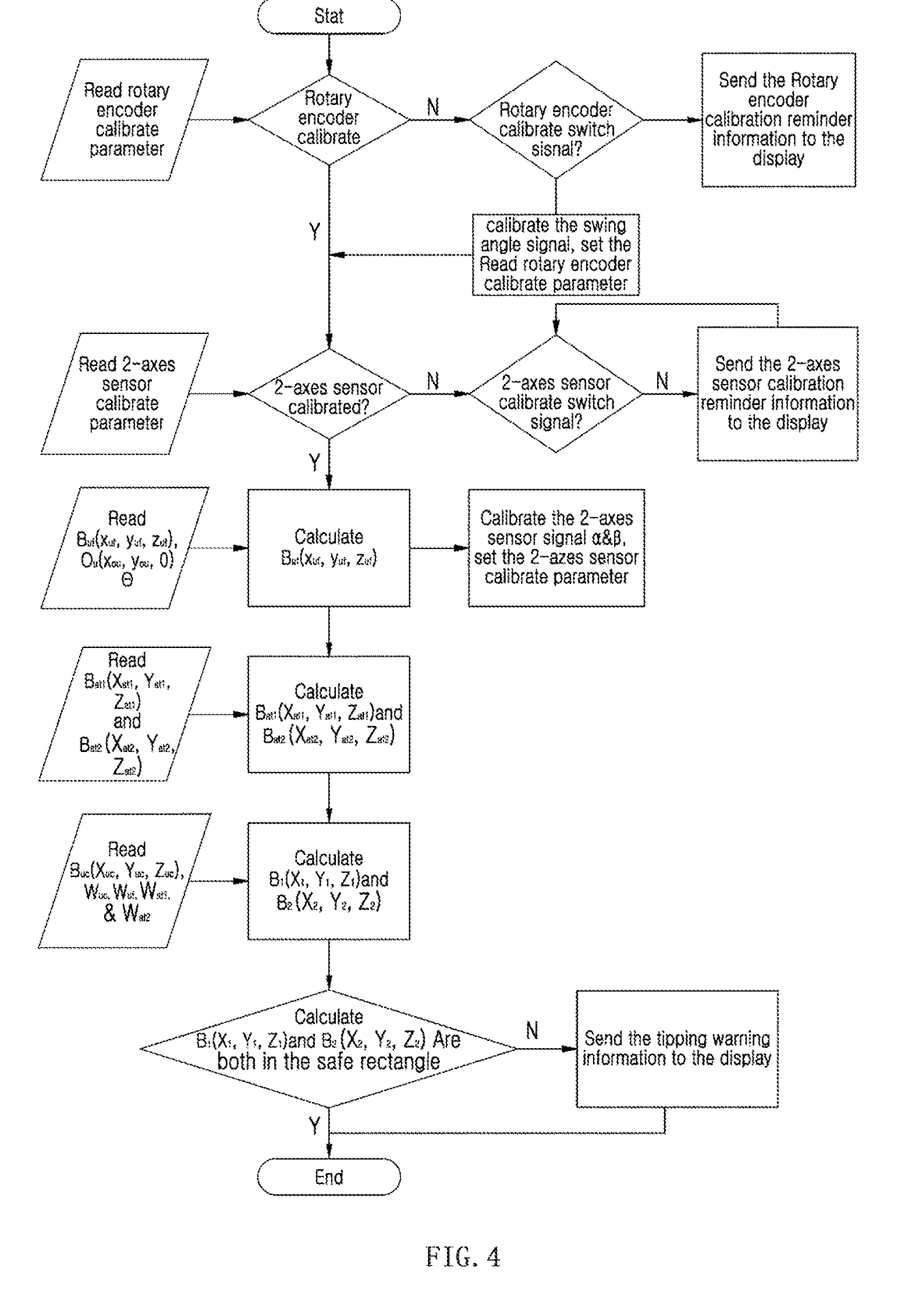
FIG. 4 is a flowchart illustrating a rollover prevention method for a construction machine according to an embodiment of the present disclosure.

FIG. 4 is a flowchart illustrating a rollover prevention method for a construction machine according to an embodiment of the present disclosure. The rollover prevention method includes:

a step of detecting a change in the swing angle of the upper frame 5 about the swing axis Z with respect to the turning joint 11 using the first angle detection unit 12 disposed adjacent to the turning joint 11;

a step of detecting an angular movement of the upper swing structure 6 along the upper frame width axis X' and the longitudinal axis Y' of a construction machine using the second angle detection unit 13 disposed adjacent to the upper frame 5;

a step of calculating barycentric coordinates $B_{uf}(x_{uf}, y_{uf}, z_{uf})$ of the upper frame 5 defined with respect to the undercarriage width axis X, the longitudinal axis Y, and the swing axis Z;

a step of calculating a first barycenter $B_{at1}(X_{at1}, Y_{at1}, Z_{at1})$ of a work attachment in a first state, in which the bucket 4 is fully loaded at a farthest distance to the swing axis Z, and a second barycenter $B_{at2}(X_{at2}, Y_{at2}, Z_{at2})$ of the work attachment in a second state, in which the bucket 4 is not loaded at a closest distance to the swing axis Z, based on a first weight $W_{at1}$ of the work attachment determined in the first state and a second weight $W_{at2}$ of the work attachment determined in the second state; and a step of calculating a first barycenter $B_1(X_1,Y_1,Z_1)$ of the construction machine and a second barycenter $B_2(X_2,Y_2,Z_2)$ of the construction machine, based on barycentric coordinates $B_{uc}(X_{uc}, Y_{uc}, Z_{uc})$ of the undercarriage 1, the weight $W_{uc}$ of the undercarriage 1, the weight $W_{uf}$ of the upper frame 5, the weight $W_{at1}$ of the work attachment in the first state, and the weight $W_{at2}$ of the work attachment in the second state. The first angle detection unit 12 is implemented as a rotary encoder, while the second angle detection unit 13 is implemented as a 2-axis angle sensor.

As illustrated in FIG. 4, parameters regarding a change in the angle about the swing axis Z of the turning joint 11 are read from the rotary encoder, and the controller 14 or the barycenter calculating section 14a calculates and calibrates barycentric coordinates.

In addition, parameters regarding a change in the angle about the upper frame width axis X' and the longitudinal axis Y' are read from the 2-axis angle sensor, and the controller 14 or the barycenter calculating section 14a calculates and calibrates barycentric coordinates.

FIG. 5a and FIG. 5b are schematic views illustrating the barycenters of the undercarriage, the upper frame, and the work attachment of a construction machine.

As illustrated in FIGS. 5a and 5b, the undercarriage, the upper frame, and the work attachment are schematically represented using blocks. The second angle detection unit 13 implemented as the 2-axis angle sensor defines an incline angle α along the axis X' and an incline angle β along the axis Y' based on horizontal plane, while the first angle detection unit 12 implemented as the rotary encoder defines a swing angle θ in the axis Z. In the position in which the work attachment 11 faces forwards, the swing angle θ is set to "zero (0)."

According to the present disclosure, the barycentric coordinates $B_{uc}(X_{uc},Y_{uc},Z_{uc})$ of the undercarriage, the barycentric coordinates $B_{uf}(X_{uf},Y_{uf},Z_{uf})$ of the upper frame, and the barycentric coordinates $B_{at}(X_{at},Y_{at},Z_{at})$ of the work attachment are individually calculated and determined as follows:

Calculation of Barycentric Coordinates $B_{uc}(X_{uc},Y_{uc},Z_{uc})$ of Undercarriage If there are n parts for the undercarriage 1, the weight for each part is from $w_1$ to $w_n$, coordinates for each part barycentric are from $(X_1,Y_1,Z_1)$ to $(X_n,Y_n,Z_n)$, then:

$$\begin{cases} Xuc = \dfrac{\sum_{i=1}^{n}(xi \times wi)}{\sum_{i=1}^{n} wi} \\[6pt] Yuc = \dfrac{\sum_{i=1}^{n}(yi \times wi)}{\sum_{i=1}^{n} wi} \\[6pt] Zuc = \dfrac{\sum_{i=1}^{n}(zi \times wi)}{\sum_{i=1}^{n} wi} \end{cases} \quad (3.1)$$

The whole weight of the undercarriage (1) is $$W_{uc} = \Sigma_{i=1}^{n} wi \quad (3.2)$$

Calculation of Barycentric Coordinates $B_{uf}(X_{uf},Y_{uf},Z_{uf})$ of Upper Frame In this calculation process, to detect a change in the swing angle of the upper frame 5 about the swing axis Z with respect to the turning joint 11, a step of resetting the first angle detection unit 12 is further included.

Referring to FIG. 5a, the coordinate system OXYZ is built on the bottom plane of undercarriage, therein axis X is always along the width direction of undercarriage, axis Y is always along the longitudinal direction of undercarriage, axis Z is the swing axis. The coordinate system OXYZ will move together with the undercarriage. when the swing angle θ is 0°, assume the primal barycenter for the upper frame 1 is $B_{uf0}(X_{uf0},Y_{uf0},Z_{uf0})$ Using the same method of Formula 3.1, the coordinates of $B_{uf0}(X_{uf0},Y_{uf0},Z_{uf0})$ can be obtained. In this case, when the rotary encoder 12 is used on the construction machine for the first time, it need to be calibrated, which means when θ is equal to 0°, the attachment is right in the front of the construction machine. When upper frame rotate θ according to the swing axis Z:

$$Z_{uf} = Z_{uf0} \quad (3.3)$$

In order to get the full coordinates of $B_{uf}$, only the 2-dimension axis system OXY needs to be considered:

$$\begin{bmatrix} X_{uf} \\ Y_{uf} \end{bmatrix} = \begin{bmatrix} \cos\theta & -\sin\theta \\ \sin\theta & \cos\theta \end{bmatrix} \cdot \begin{bmatrix} X_{uf\,0} \\ Y_{uf\,0} \end{bmatrix} \quad (3.4)$$

Then, the coordinates $X_{uf}$ and $Y_{uf}$ can be obtained as follows:

$$\begin{cases} X_{uf} = X_{uf\,0} * \cos\theta - Y_{uf\,0} * \sin\theta \\ Y_{uf} = X_{uf\,0} * \sin\theta + Y_{uf\,0} * \cos\theta \end{cases} \quad (3.5)$$

Figure 6:
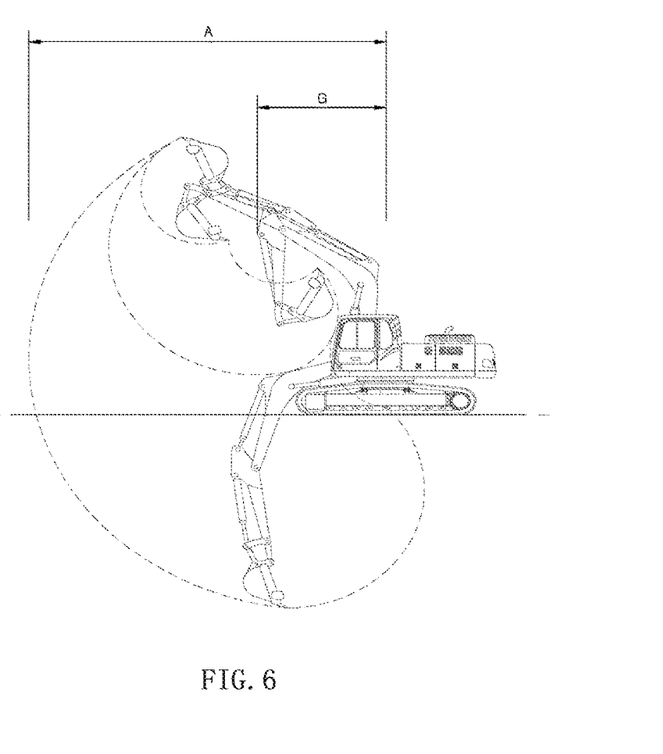
FIG. 6 is a schematic view illustrating routes drawn by the movement of the bucket illustrated in FIG. 1.

Calculation of Barycentric Coordinates $B_{at}(X_{at},Y_{at},Z_{at})$ of Work Attachment FIG. 6 is a schematic view illustrating routes drawn by the movement of the bucket illustrated in FIG. 1.

Referring to FIG. 6, the relative barycenter of the work attachment differs depending on the position of the work attachment. Thus, in order to get the coordinates of the barycenter $B_{at}$ of the work attachment, it is assumed that the work attachment 10 has two extreme states as follows:

First state: with the farthest distance A to the swing axis and the fully loaded bucket, the weight of attachment is $W_{at1}$; and Second state: with the closest distance G to the swing axis and the non-load bucket, the weight of attachment is $W_{at2}$.

The first state has the most possibility to tip according to the front interface edge between the undercarriage and the slope (hereon, front and back direction is according to the view of driver in the cabin), and the second state has the most possibility to tip according to the back interface edge. The barycenter of the first state and the second state is $B_{at1}$ ($X_{at1}, Y_{at1}, Z_{at1}$) and $B_{at2}(X_{at2}, Y_{at2}, Z_{at2})$ individually.

When swing angle θ equals to 0° and it is assumed that the barycenter coordinates of the attachment in the first state and second state is $B_{at1'}(X_{at1'}, Y_{at1'}, Z_{at1'})$ and $B_{at2'}(X_{at2'}, Y_{at2'}, Z_{at2'})$ individually, $B_{at1}(X_{at1}, Y_{at1}, Z_{at1})$ and $B_{at2}(X_{at2}, Y_{at2}, Z_{at2})$ can be formulated according to the similar method of Formula 3.1. Further, with the similar method of Formula 3.5, the coordinates of $B_{at1}(X_{at1}, Y_{at1}, Z_{at1})$ and $B_{at2}(X_{at2}, Y_{at2}, Z_{at2})$ can be formulated as follows:

$$\begin{cases} X_{at\,1} = X_{at\,1'} * \cos\theta - Y_{at\,1'} * \sin\theta \\ Y_{at\,1} = X_{at\,1'} * \sin\theta + Y_{at\,1'} * \cos\theta \\ Z_{at\,1} = Z_{at\,1'} \end{cases} \quad (3.6)$$

$$\begin{cases} X_{at\,2} = X_{at\,2'} * \cos\theta - Y_{at\,2'} * \sin\theta \\ Y_{at\,2} = X_{at\,2'} * \sin\theta + Y_{at\,2'} * \cos\theta \\ Z_{at\,2} = Z_{at\,2'} \end{cases} \quad (3.7)$$

In order to calculate the coordinates $B_1$ and $B_2$ of the whole machine in the first state and the second state individually, it is assumed that the weights of the upper frame, the attachment in the first state, and the attachment in the second state are $W_{uf}$, $W_{at1}$, and $W_{at2}$ individually, the calculation method is similar to the method of Formula 3.1. Then, $B_1(X_1, Y_1, Z_1)$ and $B_2(X_2, Y_2, Z_2)$ can be formulated as follows:

$$\begin{cases} B_1 = \dfrac{B_{uc} \times W_{uc} + B_{uf} \times W_{uf} + B_{at\,1} \times W_{at\,1}}{W_{uc} + W_{uf} + W_{at\,1}} \\ B_2 = \dfrac{B_{uc} \times W_{uc} + B_{uf} \times W_{uf} + B_{at\,2} \times W_{at\,2}}{W_{uc} + W_{uf} + W_{at\,2}} \end{cases} \quad (4.1)$$

Next, referring to FIG. 5a, the coordinate system OXYZ is built on the bottom plane of undercarriage, therein axis X is always along the width direction of undercarriage, axis Y is always along the longitudinal direction of undercarriage, the coordinate system OXYZ will move together with the undercarriage. The coordinate system O'X'Y'Z' is built on the bottom plane of upper frame, therein axis X' is always along the width direction of upper frame, axis Y' is always along the longitudinal direction of upper frame, the coordinate system O'X'Y'Z' will move or rotate together with the upper frame. Assume there's a horizontal plane H through point O, and the equation of H plane is:

$$x + By + Cz = 0 \quad (5.1)$$

Tipping angle "α" equals to the angle between axis X' (parallel to the width direction of upper frame) and the horizontal plane H, tipping angle "β" equals to the angle between axis Y' (parallel to the longitudinal direction of upper frame) and the horizontal plane H. With rotating angle "θ", the unit vector $\vec{x}'$ along axis X' and vector $\vec{y}'$ along axis Y' in coordinate system OXYZ can be presented as below:

$$\vec{x}' = (\cos\theta, \sin\theta, 0) \quad (5.2)$$

$$\vec{y}' = (-\sin\theta, \cos\theta, 0) \quad (5.3)$$

And the vector $\vec{v}'$ is a normal vector of the horizontal plane H, it can be presented as below:

$$\vec{v}' = (1, B, C) \quad (5.4)$$

According to the definition of angle "α" and "β", then $$\begin{cases} \cos\left(\dfrac{\pi}{2} - \alpha\right) = \dfrac{\vec{x}' \cdot \vec{v}'}{|\vec{v}'|} = \dfrac{\cos\theta + B \times \sin\theta}{\sqrt{1 + B^2 + C^2}} \\ \cos\left(\dfrac{\pi}{2} - \beta\right) = \dfrac{\vec{y}' \cdot \vec{v}'}{|\vec{v}'|} = \dfrac{-\sin\theta + B \times \cos\theta}{\sqrt{1 + B^2 + C^2}} \end{cases} \quad (5.5)$$

Via formula 5.5, the value of B and C can be calculated. Further, formulae for the plumb line through points B1(X1, Y1, Z1) and B2(X2, Y2, 72) in the coordinate system OXYZ can be obtained. Plumb line through point B1(X1, Y1, Z1) is:

$$\dfrac{x - X_1}{1} = \dfrac{y - Y_1}{B} = \dfrac{z - Z_1}{C} \quad (5.6)$$

Plumb line through point $B_2(X_2, Y_2, Z_2)$ is:

$$\dfrac{x - X_2}{1} = \dfrac{y - Y_2}{B} = \dfrac{z - Z_2}{C} \quad (5.7)$$

Assume the cross point of the plumb line through $B_1(X_1, Y_1, Z_1)$ and the plane XOY is $B'_1(X'_1, Y'_1, 0)$, the cross point of the plumb line through $B_2(X_2, Y_2, Z_2)$ and the plane XOY is $B'_2(X'_2, Y'_2, 0)$ in the coordinate system OXYZ. According to Formula 5.6, $B'_1(X'_1, Y'_1, 0)$ can be obtained as follows:

$$\begin{cases} X'_1 = X_1 - \dfrac{Z_1}{C} \\ Y'_1 = Y_1 - \dfrac{B \times Z_1}{C} \end{cases} \quad (5.8)$$

According to the Formula 5.7, $B'_2(X'_2, Y'_2, 0)$ can be obtained as follows:

$$\begin{cases} X'_2 = X_2 - \dfrac{Z_2}{C} \\ Y'_2 = Y_2 - \dfrac{B \times Z_2}{C} \end{cases} \quad (5.9)$$

In this calculation process, to detect the angular movement of the upper swing structure 6 or the upper frame 5 along the width axis X' and the longitudinal axis Y' of the construction machine, a step of resetting the second angle detection unit 13 is further included.

Comparison with Safety Range and Determination

The present disclosure includes a step of determining whether or not the first barycenter $B_1$ of the construction machine or the second barycenter $B_2$ of the construction machine are present in the safety range, in which the safety range is set within a critical range defined by the contact surface between the undercarriage 1 and the ground. The critical range is limited to a rectangular structure having a width W of the contact surface parallel to the axis X and a length L of the contact surface parallel to the axis Y. The width and length of the safety range depends on a preset critical parameter γ, and are smaller than the width W and the length L of the contact surface.

For example, it is possible to determine whether or not the construction machine may roll over by comparing the coordinates of $B'_1(X'_1, Y'_1, 0)$ and $B'_2(X'_2, Y'_2, 0)$ with the formulae of the contact surface between the undercarriage and the slope.

As illustrated in FIG. 5b, it is assumed that the width of the contact surface between the undercarriage and the slope is W, and the length is L, and then, the contact surface can be described in the coordinate system OXY as follows:

$$\begin{cases} w_1 \leq x \leq w_4 & (w_4 - w_1 = W) \\ l_1 \leq y \leq l_4 & (l_4 - l_1 = L) \end{cases} \quad (6.1)$$

Next, referring to FIG. 5b, when the coordinates of $B'_1(X'_1, Y'_1, 0)$ and $B'_2(X'_2, Y'_2, 0)$ are compared with Formula 6.1, if $B'_1(X'_1, Y'_1, 0)$ and $B'_2(X'_2, Y'_2, 0)$ fall in the safety range of Formula 6.1, the construction machine is safe. If $B'_1(X'_1, Y'_1, 0)$ or $B'_2(X'_2, Y'_2, 0)$ deviates from the safety range, there is a risk of tipping or rollover for the construction machine. In addition, in order to provide an alarm or a warning indication to an operator in advance, a critical parameter γ (0≤γ≤0.5) may be introduced, and the safety range in the coordinate system OXY can be updated as follows:

$$\begin{cases} w_2 \leq x \leq w_3 & (w_3 - w_2 = \gamma \times W; w_2 - w_1 = w_4 - w_3) \\ l_2 \leq y \leq l_3 & (l_4 - l_1 = \gamma \times L; l_2 - l_1 = l_4 - l_3) \end{cases} \quad (6.2)$$

In this step, as described above, when it is determined that the barycenter $B'_1(X'_1, Y'_1, 0)$ or the barycenter $B'_2(X'_2, Y'_2, 0)$ deviate from the safety range, information regarding the risk of rollover or the safety state is provided to the operator.

For example, the alarm signal is converted and output by the signal outputting section 14c of the controller 14. The alarm signal includes an image indicating the risk of rollover or safety state, and is provided to the display unit 42 such that the alarm signal can be visually indicated by the operator. In addition, when the alarm unit outputs an audio signal, the operator can aurally recognize a risk of rollover.

The present disclosure further includes a step of outputting a closing signal for the safety valves 40 and an alarm signal to the operator when it is determined that the first barycenter $B_1$ or the second barycenter $B_2$ of the construction machine deviates from the safety range. For example, referring to FIG. 2, when it is determined that the barycenter deviates from the threshold value of the safety range in the process of manipulating both a swing operation and a boom-up or boom-down operation, the controller 14, the controller 14 outputs valve closing signals for the safety valves 40a and 40b. Thus, the supply of working oil discharged from the first hydraulic pump 22 and the second hydraulic pump 23 is stopped, and both the swing operation of the upper frame 5 and the upper swing structure 6 and the boom operation are stopped.

When the safety valves 40a and 40b are disposed on the pilot signal lines Pi of the control device according to another embodiment of the disclosure, a pilot signal pressure output by the control device 19 is stopped and returns to the hydraulic tank T, control valve elements are converted to the neutral position, and thus the movement of the construction machine is stopped.

As set forth above, the present disclosure can be variously applied to construction machines, such as an excavator and a wheel loader. The present disclosure provides an operator with safety information while allowing the barycenter to remain in the safety range. In addition, when the barycenter of a construction machine is determined to deviate from the safety range or enter the critical range in the process of performing excavation in a construction place or on a slope, an alarm is provided to the operator and the supply of working oil is stopped, thereby preventing rollover.

In addition, according to the present disclosure, the safety consciousness of the operator is enhanced, and a rollover is prevented.

Although the present disclosure has been described with reference to the preferred embodiments in the attached figures, it is noted that equivalents may be employed and substitutions made herein without departing from the scope of the present disclosure as recited in the claims.

The invention claimed is:

1. A rollover prevention system for a construction machine, wherein the construction machine includes a work attachment such as a boom, an arm, or a bucket, a plurality of hydraulic cylinders for driving the work attachment, and a swing motor for controlling a swing operation of an upper frame, the rollover prevention system comprising:
a first angle detection unit disposed adjacent to a turning joint to detect a swing angle of the upper frame, the turning joint being disposed on a central portion of the upper frame rotatably disposed on an undercarriage;
a second angle detection unit disposed on the upper frame to detect an angular movement of the upper frame;
safety valves disposed on flow passages communicating with the hydraulic cylinders for the work attachment and the swing motor, wherein the safety valves control flows of working oil supplied to the hydraulic cylinders by opening and closing the flow passages in response to external signals; and
an electronic controller electrically connected to the first angle detection unit, the second angle detection unit, and the safety valves, the electronic controller comprising a barycenter calculating section, a safety range determining section, and a signal outputting section,
wherein the barycenter calculating section calculates a barycenter $B_{uc}$ of the undercarriage, a barycenter $B_{uf}$ of the upper frame, a barycenter $B_{at}$ of the work attachment, a first barycenter $B_1$ of the construction machine in a first state, and a second barycenter $B_2$ of the construction machine in a second state, based on values of angles applied from the first angle detection unit and the second angle detection unit based on a preset algorithm, wherein the first barycenter $B_1$ of the construction machine depends on the first state in which the bucket is fully loaded at a farthest distance to the swing axis, while the second barycenter $B_2$ of the construction machine depending on the second state in which the bucket is not loaded at a closest distance G from the swing axis,
wherein the safety range determining section determines whether or not the first barycenter $B_1$ and the second barycenter $B_2$ of the construction machine are present in a safety range, and
wherein signal outputting section provides a closing signal for the safety valves and an alarm signal to the operator when the first barycenter $B_1$ or the second barycenter $B_2$ of the construction machine deviate from the safety range.

2. The rollover prevention system according to claim 1, further comprising a display unit connected to the controller, wherein the display unit outputting the safety range provided by the signal outputting section of the controller such that the safety range is visually recognizable by the operator.

3. The rollover prevention system according to claim 1, further comprising an alarm unit connected to the controller, wherein the alarm unit provides aural information to the operator when the first barycenter $B_1$ or the second barycenter $B_2$ of the construction machine deviate from the safety range.

4. The rollover prevention system according to claim 1, wherein the safety valves include a first safety valve disposed on one of the flow passages to block a flow of oil supplied from the first hydraulic pump and a second safety valve disposed on the other of the flow passages to block a flow of oil supplied from the second hydraulic pump.

5. The rollover prevention system according to claim 1, wherein the safety valves are disposed on pilot signal lines extending from the control device to spools of hydraulic control valves.

6. The rollover prevention system according to claim 1, wherein the second angle detection unit comprises a system-on-chip device disposed on the electronic controller.

7. The rollover prevention system according to claim 4, wherein each of the safety valves comprises a solenoid valve.

8. The rollover prevention system according to claim 5, wherein each of the safety valves comprises a solenoid valve.

9. The rollover prevention system according to claim 1, wherein the first angle detection unit comprises a rotary encoder.

10. The rollover prevention system according to claim 1, wherein the second angle detection unit comprises a 2-axis angle sensor.

11. The rollover prevention system according to claim 6, wherein the second angle detection unit comprises a 2-axis angle sensor.

12. A rollover prevention method for a construction machine, comprising:
detecting a change in a swing angle of an upper frame of a construction machine about a swing axis Z with respect to a turning joint using a first angle detection unit disposed adjacent to the turning joint;
detecting an angular movement of the upper frame along a width axis X' and a longitudinal axis Y' of the construction machine using a second angle detection unit disposed adjacent to the upper frame;
calculating barycentric coordinates $B_{uf}(X_{uf}, Y_{uf}, Z_{uf})$ of the upper frame defined with respect to the width axis X, the longitudinal axis Y, and the swing axis Z;
calculating a first barycenter $B_{at1}(X_{at1}, Y_{at1}, Z_{at1})$ of a work attachment in a first state, in which a bucket is fully loaded at a farthest distance to the swing axis Z, and a second barycenter $B_{at2}(X_{at2}, Y_{at2}, Z_{at2})$ of the work attachment in a second state, in which the bucket is not loaded at a closest distance to the swing axis Z, based on a first weight $W_{at1}$ of the work attachment determined in the first state and a second weight $W_{at2}$ of the work attachment determined in the second state;
calculating a first barycenter $B_1(X_1, Y_1, Z_1)$ of the construction machine in the first state and a second barycenter $B_2(X_2, Y_2, Z_2)$ of the construction machine in the second state, based on barycentric coordinates $B_{uc}(X_{uc}, Y_{uc}, Z_{uc})$ of the undercarriage, the weight $W_{uc}$ of the undercarriage, the weight $W_{uf}$ of the upper frame, the weight $W_{at1}$ of the work attachment in the first state, and the weight $W_{at2}$ of the work attachment in the second state,
wherein $X_{uf}, Y_{uf}, Z_{uf}, X_{at1}, Y_{at1}, Z_{at1}, X_{uc}, Y_{uc}, Z_{uc}, W_{uc}, B_1$, and $B_2$ are defined by the following formulae:

$$X_{uf} = X_{uf\,0} * \cos\theta - Y_{uf\,0} * \sin\theta;$$

$$Y_{uf} = X_{uf\,0} * \sin\theta + Y_{uf\,0} * \cos\theta;$$

$$Zuf = Zuf0;$$

$$X_{at\,1} = X_{at\,1'} * \cos\theta - Y_{at\,1'} * \sin\theta;$$

$$Y_{at\,1} = X_{at\,1'} * \sin\theta + Y_{at\,1'} * \cos\theta;$$

$$Z_{at\,1} = Z_{at\,1'};$$

$$X_{at\,2} = X_{at\,2'} * \cos\theta - Y_{at\,2'} * \sin\theta;$$

$$Y_{at\,2} = X_{at\,2'} * \sin\theta + Y_{at\,2'} * \cos\theta;$$

$$Z_{at\,2} = Z_{at\,2'};$$

$$Xuc = \frac{\sum_{i=1}^{n}(xi \times wi)}{\sum_{i=1}^{n} wi};$$

$$Yuc = \frac{\sum_{i=1}^{n}(yi \times wi)}{\sum_{i=1}^{n} wi};$$

$$Zuc = \frac{\sum_{i=1}^{n}(zi \times wi)}{\sum_{i=1}^{n} wi};$$

$$W_{uc} = \sum_{i=1}^{n} wi;$$

$$B_1 = \frac{B_{uc} \times W_{uc} + B_{uf} \times W_{uf} + B_{at\,1} \times W_{at\,1}}{W_{uc} + W_{uf} + W_{at\,1}}; \text{ and}$$

$$B_2 = \frac{B_{uc} \times W_{uc} + B_{uf} \times W_{uf} + B_{at\,2} \times W_{at\,2}}{W_{uc} + W_{uf} + W_{at\,2}}.$$

13. The rollover prevention method according to claim 12, further comprising
determining whether or not the first barycenter $B_1$ of the construction machine and the second barycenter $B_2$ of the construction machine are present in the safety range, wherein the safety range is set within a critical range defined by a contact surface between the undercarriage and a ground, wherein the critical range is limited to a rectangular structure having a width W of the contact surface along the axis X and a length L of the contact surface along axis Y.

14. The rollover prevention method according to claim 12, further comprising outputting a closing signal for safety valves and an alarm signal to an operator when it is determined that the first barycenter $B_1$ or the second barycenter $B_2$ of the construction machine deviates from the safety range.

15. The rollover prevention method according to claim 12, further comprising resetting the first angle detection unit to detect the change in the swing angle of the upper frame about the swing axis Z with respect to the turning joint.

16. The rollover prevention method according to claim 15, further comprising resetting the second angle detection unit to detect the angular movement of the upper swing structure or the upper frame along the width axis X' and the longitudinal axis Y' of the construction machine.

17. The rollover prevention method according to claim 12, wherein the first angle detection unit comprises a rotary encoder, and the second angle detection unit comprises a 2-axis angle sensor.

18. The rollover prevention method according to claim 12,
wherein the 2-axis angle sensor defines an incline angle $\alpha$ along the axis X' and an incline angle $\beta$ along the axis Y', while the rotary encoder defines a swing angle $\theta$ in the axis Z, and
wherein, in a position in which the work attachment faces forwards, the swing angle $\theta$ is set to 0.

* * * * *